(12) United States Patent
Gulsen et al.

(10) Patent No.: US 10,839,025 B1
(45) Date of Patent: Nov. 17, 2020

(54) BENCHMARK DEFINITION USING CLIENT BASED TOOLS

(71) Applicant: Workday, Inc., Pleasanton, CA (US)

(72) Inventors: Denis Gulsen, Redwood City, CA (US); Erol Guney, San Ramon, CA (US); Chandni K. Dhanjal, Fairfield, CA (US)

(73) Assignee: Workday, Inc., Pleasanton, CA (US)

( * ) Notice: Subject to any disclaimer, the term of this patent is extended or adjusted under 35 U.S.C. 154(b) by 380 days.

(21) Appl. No.: 15/693,939

(22) Filed: Sep. 1, 2017

(51) Int. Cl.
*G06F 16/951* (2019.01)
*G06F 21/62* (2013.01)

(52) U.S. Cl.
CPC ........ *G06F 16/951* (2019.01); *G06F 21/6245* (2013.01)

(58) Field of Classification Search
None
See application file for complete search history.

(56) References Cited

U.S. PATENT DOCUMENTS

| | | |
|---|---|---|
| 10,216,449 B1 | 2/2019 | Li |
| 2007/0234291 A1* | 10/2007 | Ronen ...................... G06F 8/36 717/120 |
| 2008/0201299 A1 | 8/2008 | Lehikoinen |
| 2009/0282045 A1* | 11/2009 | Hsieh .................. G06F 21/6218 |
| 2010/0217758 A1 | 8/2010 | Weissman |
| 2013/0018890 A1* | 1/2013 | Rajan .................. G06F 16/2272 707/741 |
| 2013/0232156 A1 | 9/2013 | Dunn |
| 2013/0347078 A1 | 12/2013 | Agarwal |
| 2014/0095966 A1 | 4/2014 | Burkard |
| 2015/0120763 A1 | 4/2015 | Grue |
| 2015/0134694 A1* | 5/2015 | Burke .................... G06Q 10/00 707/769 |
| 2018/0262864 A1 | 9/2018 | Reynolds |
| 2018/0357226 A1 | 12/2018 | Su |

\* cited by examiner

*Primary Examiner* — Aleksandr Kerzhner
*Assistant Examiner* — Eddy Cheung
(74) *Attorney, Agent, or Firm* — Van Pelt, Yi & James LLP (57) ABSTRACT

A system for using a user-defined benchmark calculation includes an interface and a processor. The interface is configured to receive an indication to use the user-defined benchmark calculation from a user associated with a tenant. The processor is configured to perform the user-defined benchmark calculation on commingled data stored in a commingled data storage unit to determine a user-defined benchmark calculation result, where the commingled data storage unit stores tenant data associated with the tenant and other tenant data associated with other tenants. The processor is configured also to provide the user-defined benchmark calculation result.

19 Claims, 10 Drawing Sheets

Calculation Warehouse User Interface

Search:

Calculation Categories:

- Employee Benchmark Calculations
- Process Benchmark Calculations
- Supply Chain Calculations
- Finance Calculations Available Calculations:

- Apple Tree Process Yield Benchmark
- Process Throughput
- Process Materials Consuption Apple Tree Process Yield Benchmark Creator: John Chapman
Company: Appleseed Industries Applicable Fields: Agriculture Description: Calculates benchmarking for apple tree process yield Price: Free Get This Calculation

BENCHMARK DEFINITION USING CLIENT BASED TOOLS

BACKGROUND OF THE INVENTION

On a software as a service platform, tenant data is strictly segregated in order to maintain separation of data belonging to different tenants. Tenant data is stored on a set of data partitions securely separated by tenant (e.g., on different computers, on different hard drives, on different virtual machines, etc.) in order to prevent users from accessing data belonging to other tenants. In some situations, tenants wish to share data for comparison purposes or to get a more complete view of a situation (e.g., salary surveys or other industry benchmarks) and they provide a data set to a third party in exchange for access to the pooled set. The third party performs computations on the pooled data set and returns the computation results to the tenants. However, this creates a problem in the event that the tenant desires to know the results of a different set of computations than those performed by the third party.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for using a user-defined benchmark calculation comprises an interface and a processor. The interface is configured to receive an indication of the user-defined benchmark calculation from a user associated with a tenant. The processor is configured to perform the user-defined benchmark calculation on commingled data stored in a commingled data storage unit to determine a user-defined benchmark calculation result, wherein the commingled data storage unit stores tenant data associated with the tenant and other tenant data associated with other tenants, and to provide the user-defined benchmark calculation result. In some embodiments, the system additionally comprises a memory coupled to the processor and configured to provide the processor with instructions.

A system for benchmark definition using client-based tools comprises a set of tenant data storage units and a commingling storage unit. Tenant data for a tenant is stored for typical system use on a tenant data storage unit. A tenant has access to its tenant data stored on its associated tenant data storage unit but not to tenant data stored on tenant data storage units associated with other tenants. In some cases, it is useful for a tenant to have access to other tenants' data for example, for the calculation of benchmark reports. For example, a tenant may desire to share its data in order to be able to determine how its own data compares to a broader set of data (e.g., benchmarks, salaries of the tenant's employees as compared to salaries of a broader set of employees, etc.). A tenant is prompted to opt in to the secure data commingling system. Tenant data is then commingled with other tenant data from other tenants to form a commingled data set. The tenant can access the results of calculations performed on the commingled data set. The system for secure commingling of tenant isolated data comprises a basic set of calculations that are performed on the commingled data set in order to calculate a basic set of results. In the event a tenant is interested in calculations other than the basic set of calculations, a calculation builder interface is available to the tenant for creating user-defined calculations. When a tenant creates a user-defined calculation, it is then available for them to perform on the commingled data set. The system provides to the tenant the basic set of calculations for the tenant to modify when creating a user-defined calculation (e.g., in the event the tenant desires just a small change from the basic calculation) as well as a set of calculation elements (e.g., intermediate calculations useful as building blocks for building complete calculations) for the tenant to take advantage of when creating a user-defined calculation.

The system for benchmark definition additionally provides a calculation warehouse for use as a marketplace and/or warehouse for user-defined calculations. The calculation warehouse comprises a plurality of available calculations. When a tenant creates a user-defined calculation, the tenant has the option to add it to the calculation warehouse. The tenant may choose to make it available to other tenants for free, or to sell or license the calculation to other tenants. User-defined calculation elements are additionally available through the calculation warehouse. A tenant looking to add a specific calculation not provided by the basic set of calculations is able to build it themselves using the calculation builder, acquire it via the calculation warehouse, build it utilizing calculation elements provided by the system or acquired via the calculation warehouse, build it using a combination of elements, self-building, prior defined calculations, etc.

User-defined calculations created by a tenant or accessed by the tenant via the calculation warehouse are stored by the system for benchmark definition using client-based tools as part of a calculation library associated with the user. When the user desires to learn the result of a calculation it makes an indication to the system to perform the calculation. The system accesses the calculation stored in the calculation library and executes the calculation on the commingled data set, comprising tenant data associated with the tenant and other data associated with other tenants. The system determines a calculation result and provides the calculation result to the requesting tenant.

Figure 1:
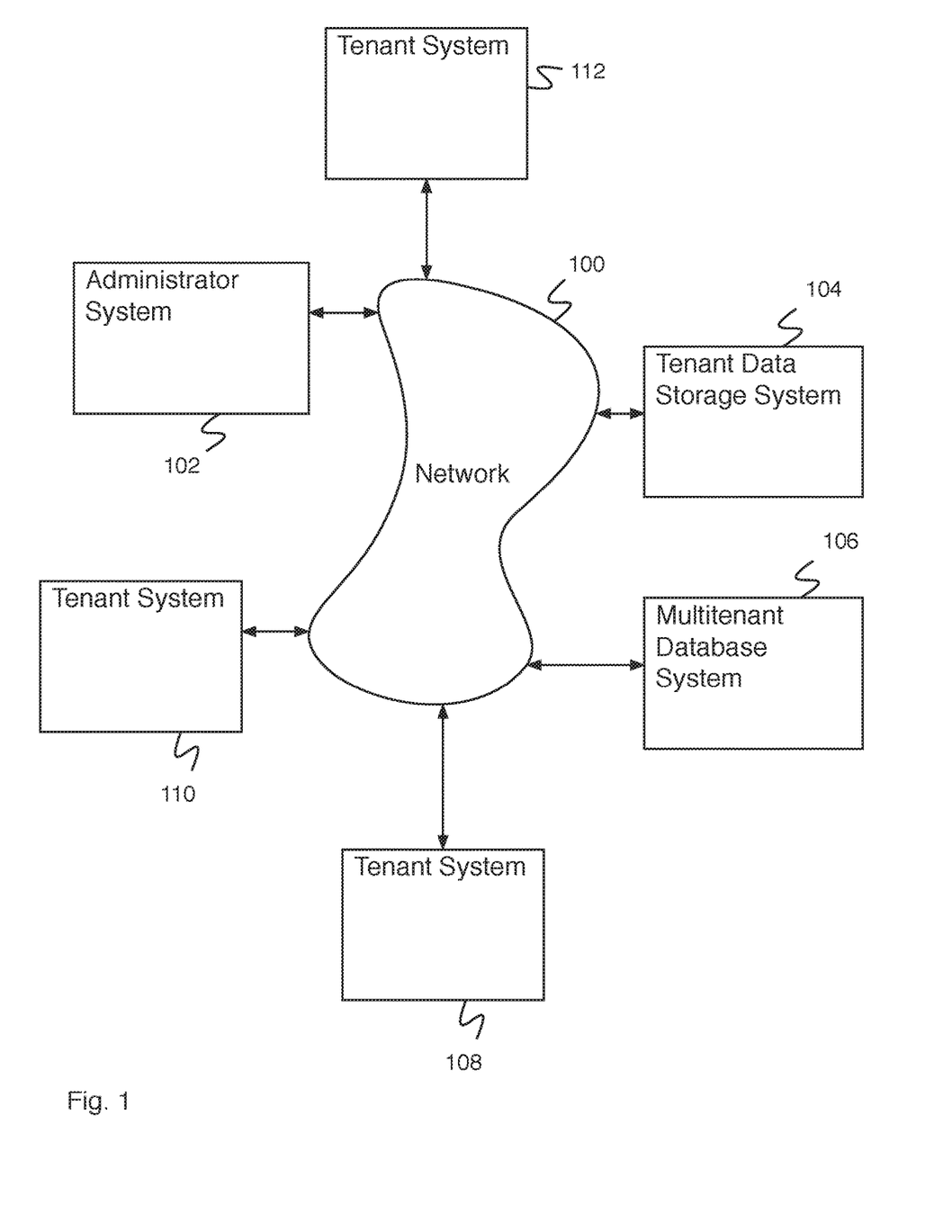
FIG. 1 is a block diagram illustrating an embodiment of a network system.

FIG. 1 is a block diagram illustrating an embodiment of a network system. In some embodiments, the network system of FIG. 1 comprises a system for benchmark definition using client based tools. In the example shown, a user using a tenant system (e.g., tenant system 108, tenant system 110, or tenant system 112) uses a user interface generated by a commingling system (e.g., either part of multitenant database system 106 or tenant data storage system 104 or both) enabling a user to define a calculation (e.g., a benchmark). The user interface enables the user to define a calculation using self-defined, stored calculation elements, and/or stored prior-defined calculations. The calculation is then stored and can be used be the user, by other tenant associated users, or by users of other tenants as indicated by the definer of the calculation. The calculation is stored by commingled storage and indexed for search (e.g., either part of multitenant database system 106 or tenant data storage system 104 or both). In some cases, in the event that the calculation is only to be used by the user or by the users of the same tenant, the calculation is stored by a tenant storage unit and indexed for search. The user is then able to use the calculation to calculate analytics using commingled data.

Tenant system 108, tenant system 110, and tenant system 112 store data associated with each of the different systems in separate areas of tenant data storage system 104. This separation ensures that a given tenant's data is secure. However, there are times when it is useful to have access to a pool of many tenants' data in exchange for providing access to the tenant's own data. Data that is part of the multitenant pool of data is stored either in tenant data storage system 104 in a commingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. Administrator system 102 is able to administrate different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, tenant system 108, tenant system 110, and tenant system 112 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored either in a commingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a commingling storage area of either tenant data storage system 104 or multitenant database system 106. A secure data commingling system includes interfaces for transmitting and receiving tenant data (e.g., from one or more tenant data storage units to a commingling storage area).

The secure data commingling system additionally comprises a processor for providing to a tenant a calculation creation user interface and a calculation warehouse user interface, and for accessing and executing a user-defined calculation stored in a calculation library.

Figure 3:
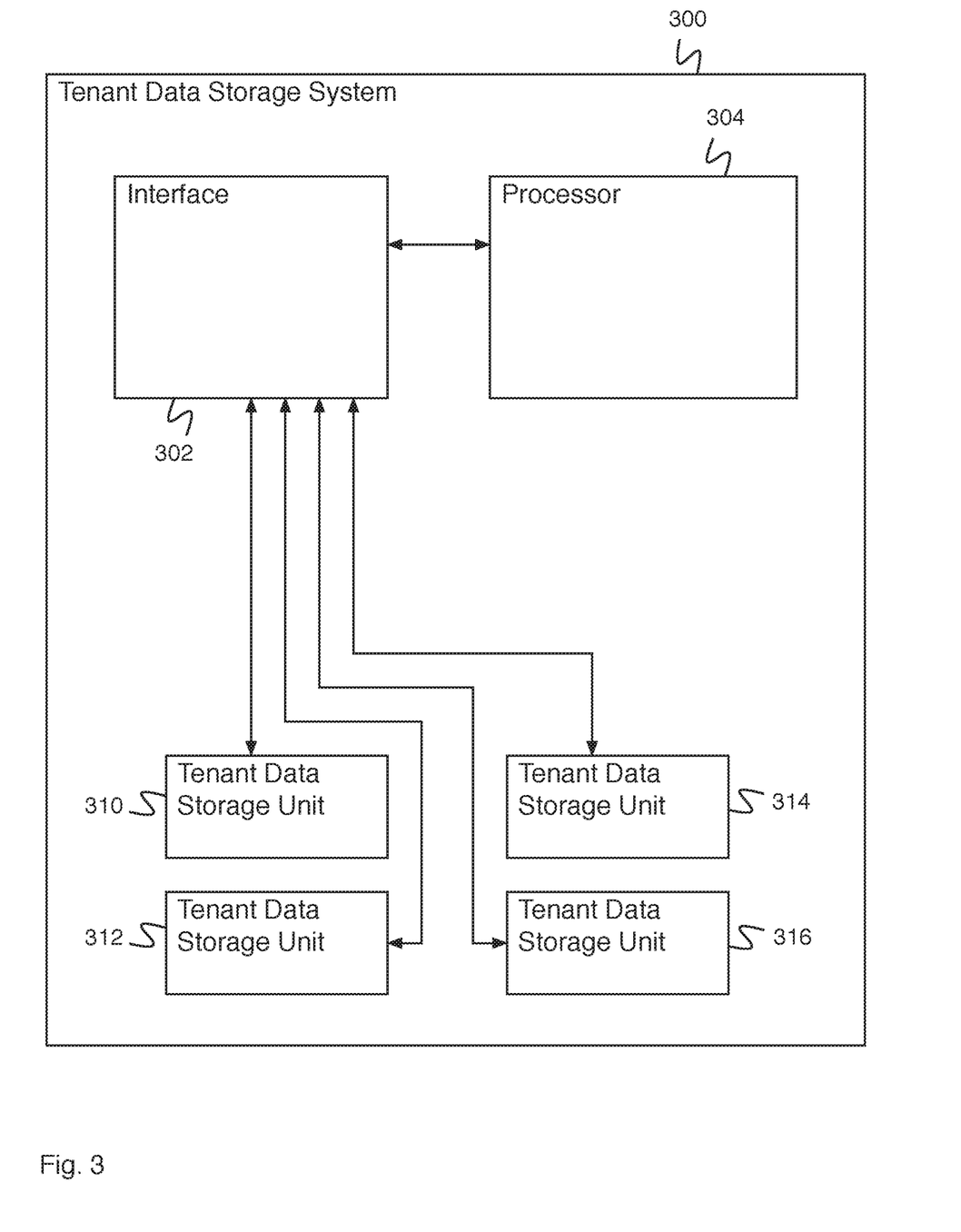
FIG. 3 is a block diagram illustrating an embodiment of a tenant data storage system.
Figure 4:
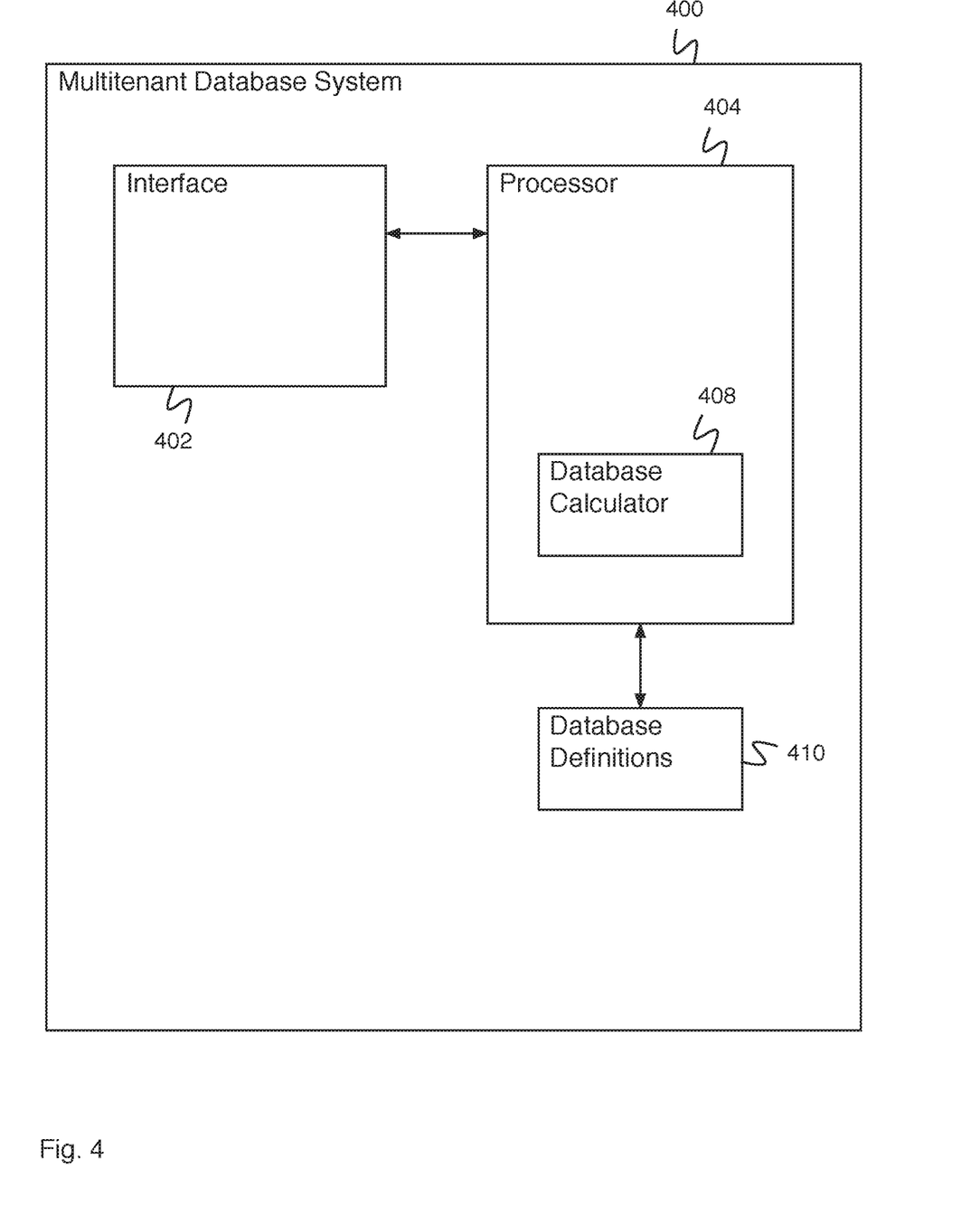
FIG. 4 is a block diagram illustrating an embodiment of a multitenant database system.
Figure 5:
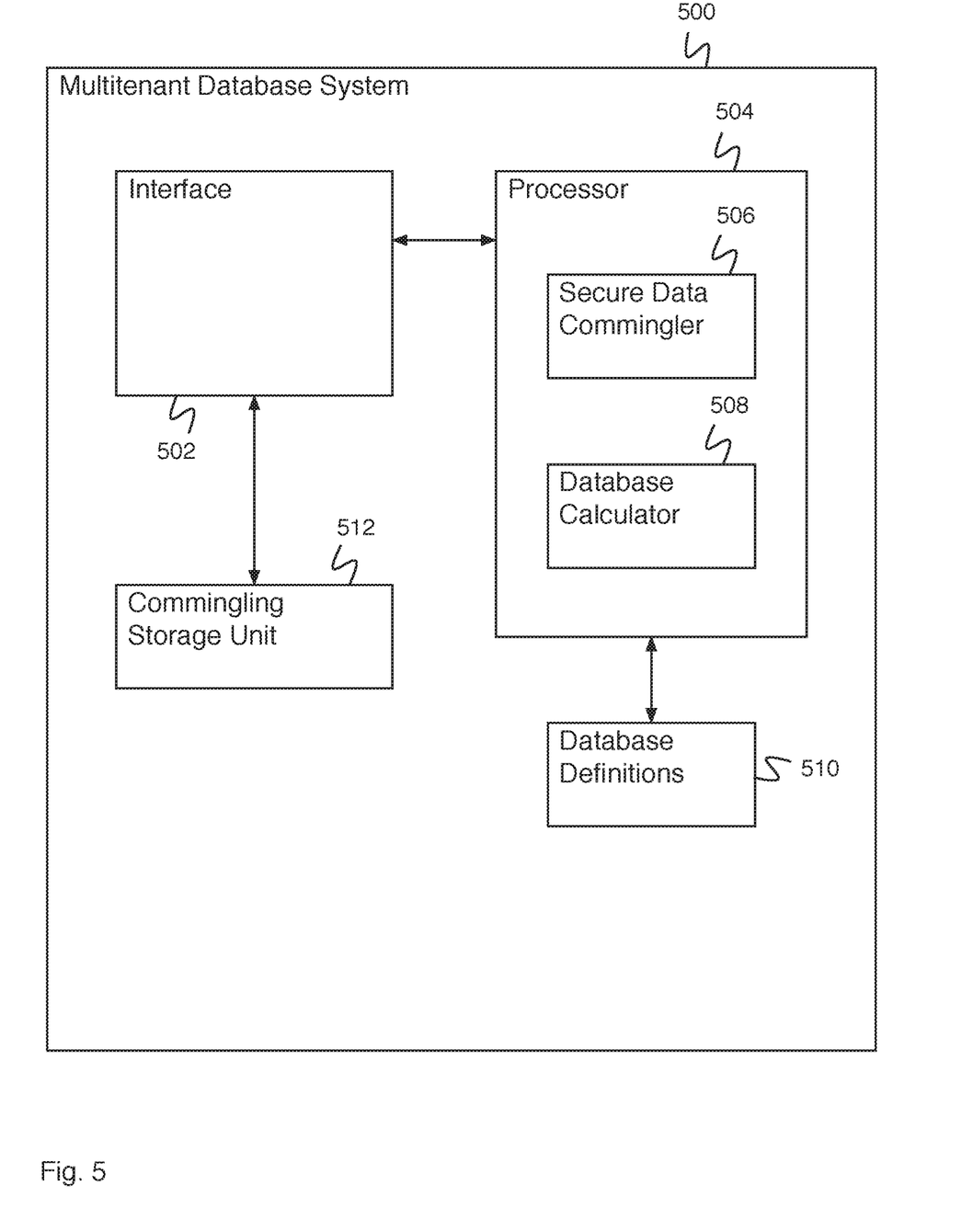
FIG. 5 is a block diagram illustrating an embodiment of a multitenant database system.

In the following FIGS. 2, 3, 4, and 5, variations of the location of the subsystems of the secure data commingler and the commingling storage unit are shown. Specifically, the location of the secure data commingler and the commingling storage unit is either in the tenant data storage unit (a combination of FIG. 2 and FIG. 5 are used as the implementations for the corresponding units in FIG. 1), the multitenant database system (a combination of FIG. 3 and FIG. 4 are used as the implementations for the corresponding units in FIG. 1), or both the tenant data storage unit and the multitenant database system (a combination of FIG. 2 and FIG. 4 are used as the implementations for the corresponding units in FIG. 1).

Figure 2:
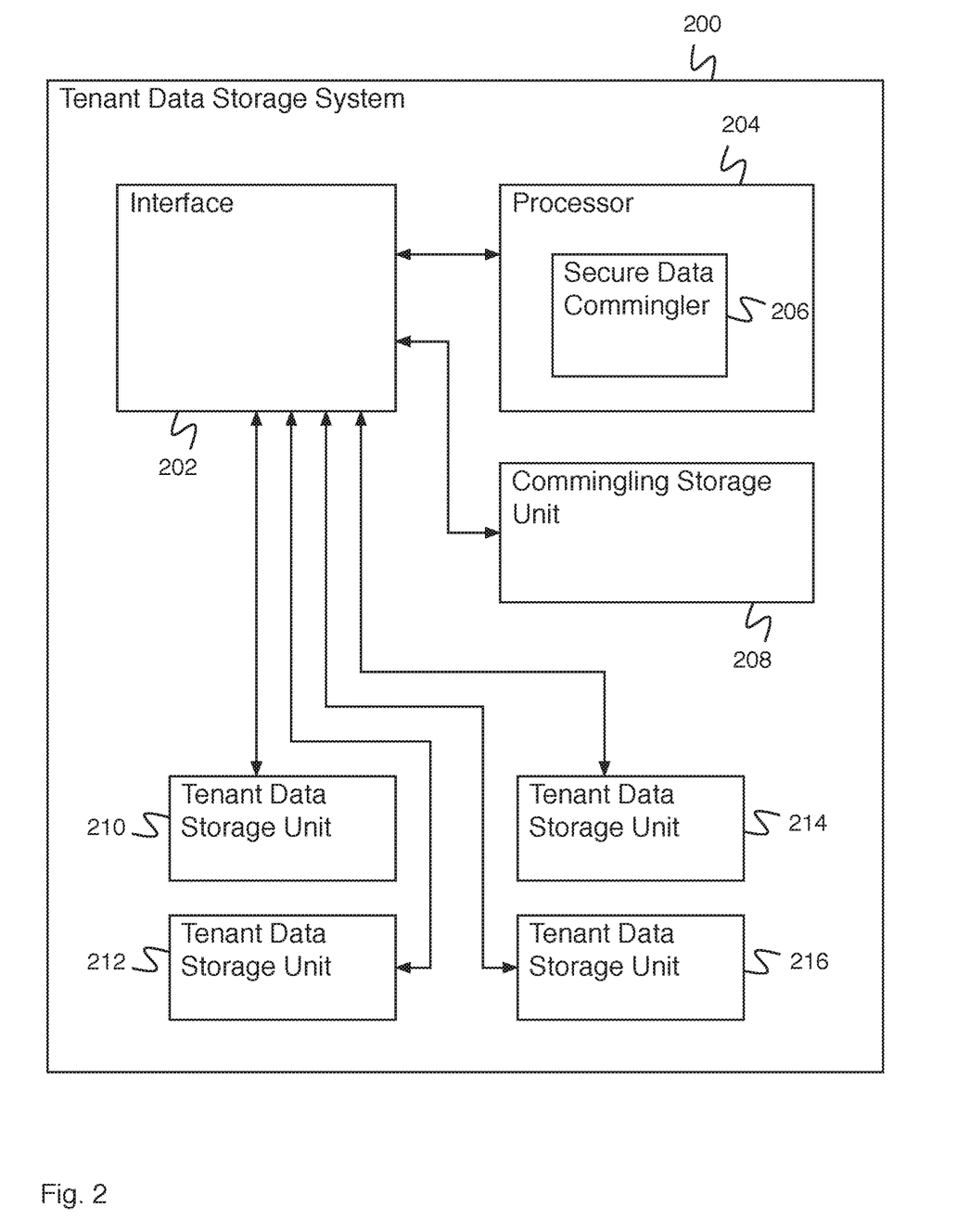
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area for example, each tenant data storage unit could be entirely associated with a different single tenant. The plurality of tenant data storage units serves to store data associated with different tenants. Tenant data storage system 200 comprises any appropriate number of tenant data storage units. In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208.

Interface 202 additionally comprises an interface for receiving an indication to transfer data to commingling storage unit 208, receiving a request to perform a calculation based on data stored in commingling storage unit 208, receiving a request to create a new user-defined calculation, receiving a request to access a user-defined calculation via a calculation warehouse, providing a user-defined calculation result, providing a report based on user-defined calculation results, etc. Processor 204 additionally comprises a processor for providing a user-defined calculation interface, for providing a calculation warehouse interface, for accessing a user-defined calculation stored in a calculation library, for executing a user-defined calculation on a commingled data set, for providing a user-defined calculation result, etc.

Each tenant data storage unit (e.g., tenant data storage unit 210, tenant data storage unit 212, tenant data storage unit 214, tenant data storage unit 216) comprises a calculation library associated with the tenant associated with the tenant data storage unit. Commingling storage unit 208 additionally comprises a calculation warehouse (e.g., a plurality of available user-defined calculations and calculation elements contributed by users associated with tenants). The calculation warehouse additionally comprises an index for the plurality of available user-defined calculations. The calculation warehouse is searchable using the index. In some embodiments, authentication is required for a user to access a user-defined calculation from the calculation warehouse (e.g., only specific users or users associated with specific tenants are allowed to access the calculation, the calculation is password protected, a user is required to purchase the calculation or pay a license fee to gain authentication to use the calculation, etc.).

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. Each tenant has associated with it a separate storage area for example, each tenant data storage unit could be entirely associated with a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data. Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316) and for providing and receiving tenant data to be commingled in a commingling storage unit.

Interface 302 additionally comprises an interface for receiving an indication to transfer data to the commingling storage unit, receiving a request to perform a calculation based on data stored in the commingling storage unit, receiving a request to create a new user-defined calculation, receiving a request to access a user-defined calculation via a calculation warehouse, providing a user-defined calculation result, providing a report based on user-defined calculation results, etc. Processor 304 additionally comprises a processor for providing a user-defined calculation interface, for providing a calculation warehouse interface, for accessing a user-defined calculation stored in a calculation library, for executing a user-defined calculation on a commingled data set, for providing a user-defined calculation result, etc. Each tenant data storage unit (e.g., tenant data storage unit 310, tenant data storage unit 312, tenant data storage unit 314, tenant data storage unit 316) comprises a calculation library associated with the tenant associated with the tenant data storage unit.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a commingling storage unit and provides the report to the user. The data in commingling storage unit is acquired using a secure data commingler from a number of tenant data storage units. A tenant can opt into sharing data for use by a service (e.g., a benchmarking service) and the data is transferred to a commingling storage unit. The data is transferred in some cases automatically when the data is updated so that the data stored in the commingling storage unit is always up to date.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a commingling storage unit (e.g., commingling storage unit 512) and provides the report to the user. The data in commingling storage unit 512 is acquired using secure data commingler 506 from a number of tenant data storage units. A tenant can opt into sharing data for use by a service (e.g., a benchmarking service) and the data is transferred to a commingling storage unit (e.g., commingling storage unit 512). The data is transferred in some cases automatically when the data is updated so that the data stored in the commingling storage unit is always up to date.

In some embodiments, the commingling storage unit and the secure data commingler is split between two systems and in that case multitenant database system 500 of FIG. 5 can be used in conjunction with tenant data storage system of FIG. 2. In some cases, each of the two commingling storage units are operated by the associated collocated secure data commingler. Data for a report is separately retrieved from each commingling storage unit.

Figure 6:
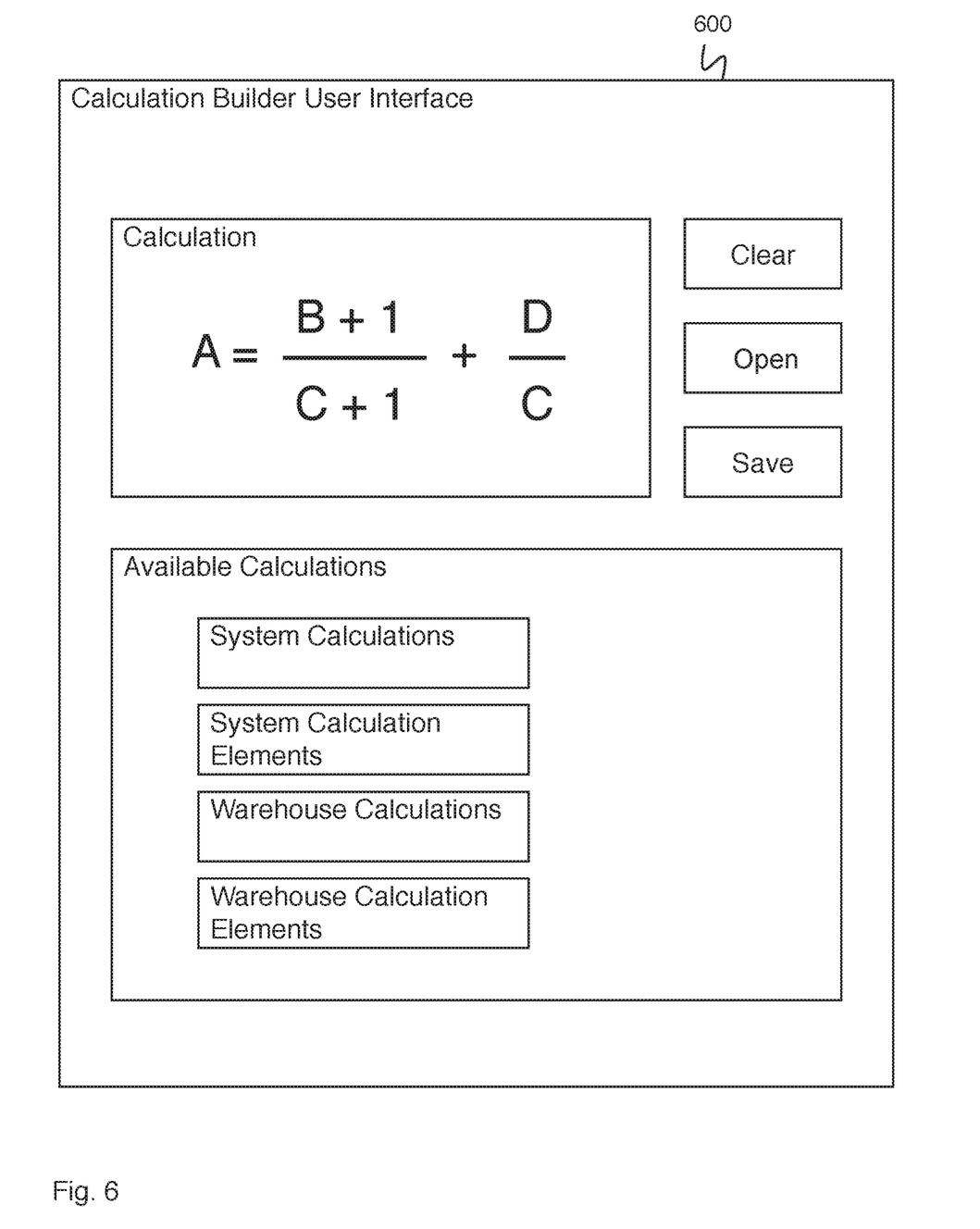
FIG. 6 is a diagram illustrating an embodiment of a calculation builder user interface.

FIG. 6 is a diagram illustrating an embodiment of a calculation builder user interface. In some embodiments, calculation builder user interface 600 is provided by tenant data storage system 104 to a tenant user using a tenant system for building a user-defined calculation. In the example shown, calculation builder user interface comprises a calculation entry window for entering a calculation $$\left(\text{e.g., calculation } A = \frac{B+1}{C+1} + \frac{D}{C}\right).$$

Calculations comprise any appropriate number of calculation elements (e.g., one calculation element, two calculation elements, three or more calculation elements, etc.) and linkage information indicating connections between calculation elements (e.g., +, *, /, etc.). Calculation builder user interface 600 additionally comprises calculation creation interaction buttons (e.g., "Clear" to clear calculation, "Open" to open a new or existing calculation, and "Save" to save a calculation). In some embodiments, "Test" (e.g., to test a calculation) and "Copy" (e.g., to copy a calculation) interaction buttons also appear in calculation builder user interface 600. Calculation builder user interface 600 additionally comprises sets of available calculations for use in building a user-defined calculation. Available calculations comprise system calculations (e.g., calculations provided by the tenant data storage system), system calculation elements (e.g., calculation building blocks provided by the tenant data storage system), warehouse calculations (e.g., calculations acquired via a calculation warehouse), and warehouse calculation elements (calculation building blocks acquired via a calculation warehouse). Available calculations and calculation elements can be included as part of a user-defined calculation using the calculation entry window. Portions of system calculations and system calculation elements can be included as part of a user-defined calculation using the calculation entry window (e.g., system calculations and system calculation elements can be directly edited and portions of system calculations and system calculation elements can be used in the creation of a user-defined calculation). In some embodiments, portions of warehouse calculations and warehouse calculation elements can be included as part of a user-defined calculation (e.g., warehouse calculations can be disallowed from revealing to a user the specifics of the calculation being performed). In some embodiments, the calculation includes a definition of an input or an input type for the calculation. In some embodiments, the calculation includes a definition of an output or an output type for the calculation.

In some embodiments, the user-defined interface provides building blocks for the user to build a user-defined calculation for example, available variables (e.g., age, gender, etc. of a person) and mathematical operators.

In some embodiments, drag and drop icons are available in calculation builder user interface for predefined calculations, calculation elements, and/or linkages between elements.

In some embodiments, the user-defined calculation is checked to determine whether the operation could expose data that is not allowed to be exposed for example, a subdivision of data that is able to isolate data.

Figure 7:
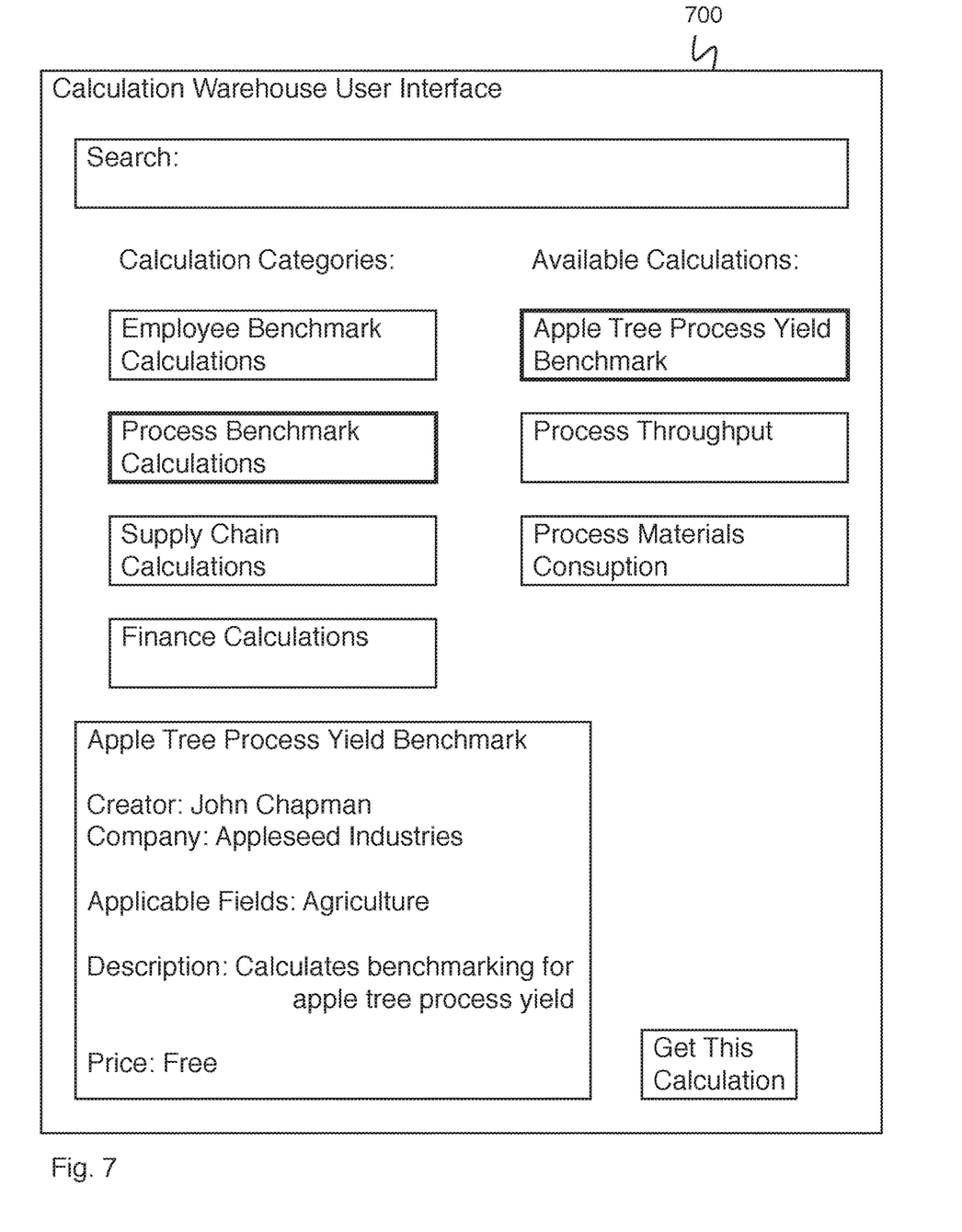
FIG. 7 is a diagram illustrating an embodiment of a calculation warehouse user interface.

FIG. 7 is a diagram illustrating an embodiment of a calculation warehouse user interface. In some embodiments, calculation warehouse user interface 700 is provided by tenant data storage system 104 to a tenant user using a tenant system for accessing user-defined calculations created by other users. In the example shown, calculation warehouse user interface comprises a set of calculation categories (e.g., employee benchmark calculations, process benchmark calculations, supply chain calculations, finance calculations, etc.), allowing a user to browse available calculations. Available calculations of a selected benchmark category are additionally shown (e.g., apple tree process yield benchmark, process throughput, process materials consumption, etc.). Information describing a selected available calculation is additionally shown (e.g., calculation name, calculation creator, calculation creator tenant/company, calculation applicable fields, calculation description, calculation price). A "Get This Calculation" button is additionally displayed, allowing a user to begin a process to acquire a calculation. Calculations may be made available for free, sold, or licensed via the calculation warehouse. Calculation warehouse user interface 700 additionally comprises a search box for searching the plurality of available calculations (e.g., by name, category, description, tags, etc.). In some embodiments, searching the calculation warehouse using the search box uses an index for searching.

Figure 8:
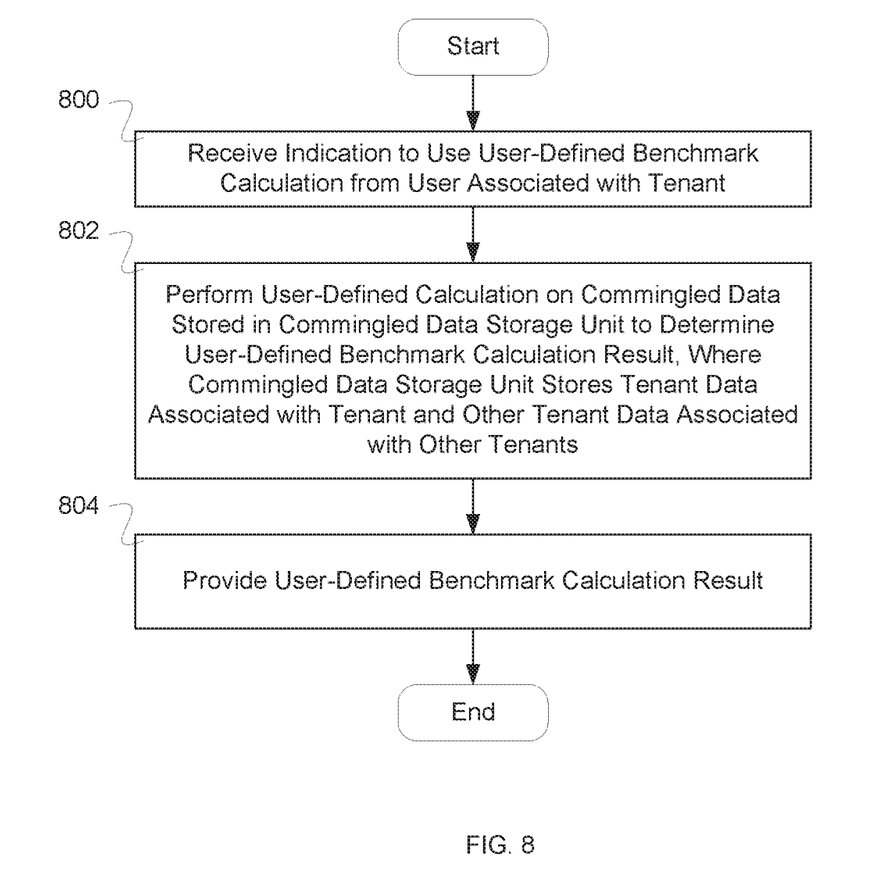
FIG. 8 is a flow diagram illustrating an embodiment of a process for using a client-based benchmark definition.

FIG. 8 is a flow diagram illustrating an embodiment of a process for using a client-based benchmark definition. In some embodiments, the process of FIG. 8 is executed by tenant data storage system 104 of FIG. 1 or multitenant database system 106 of FIG. 1. In the example shown, in 800, an indication of a user-defined benchmark calculation is received from a user associated with a tenant. In 802, the user-defined benchmark calculation is performed on commingled data stored in a commingled data storage unit to determine a user-defined benchmark calculation result, wherein the commingled data storage unit stores tenant data associated with the tenant and other tenant data associated with other tenants. In 804, the user-defined benchmark calculation result is provided.

The indication of a user-defined calculation comprises an indication of a user-defined benchmark calculation stored in a calculation library associated with a user. The user-defined benchmark calculation comprises a calculation created using a calculation builder or an available calculation from a calculation warehouse. In some embodiments, the available calculation from a calculation warehouse was contributed to the calculation warehouse by a different user associated with a different tenant.

Figure 9:
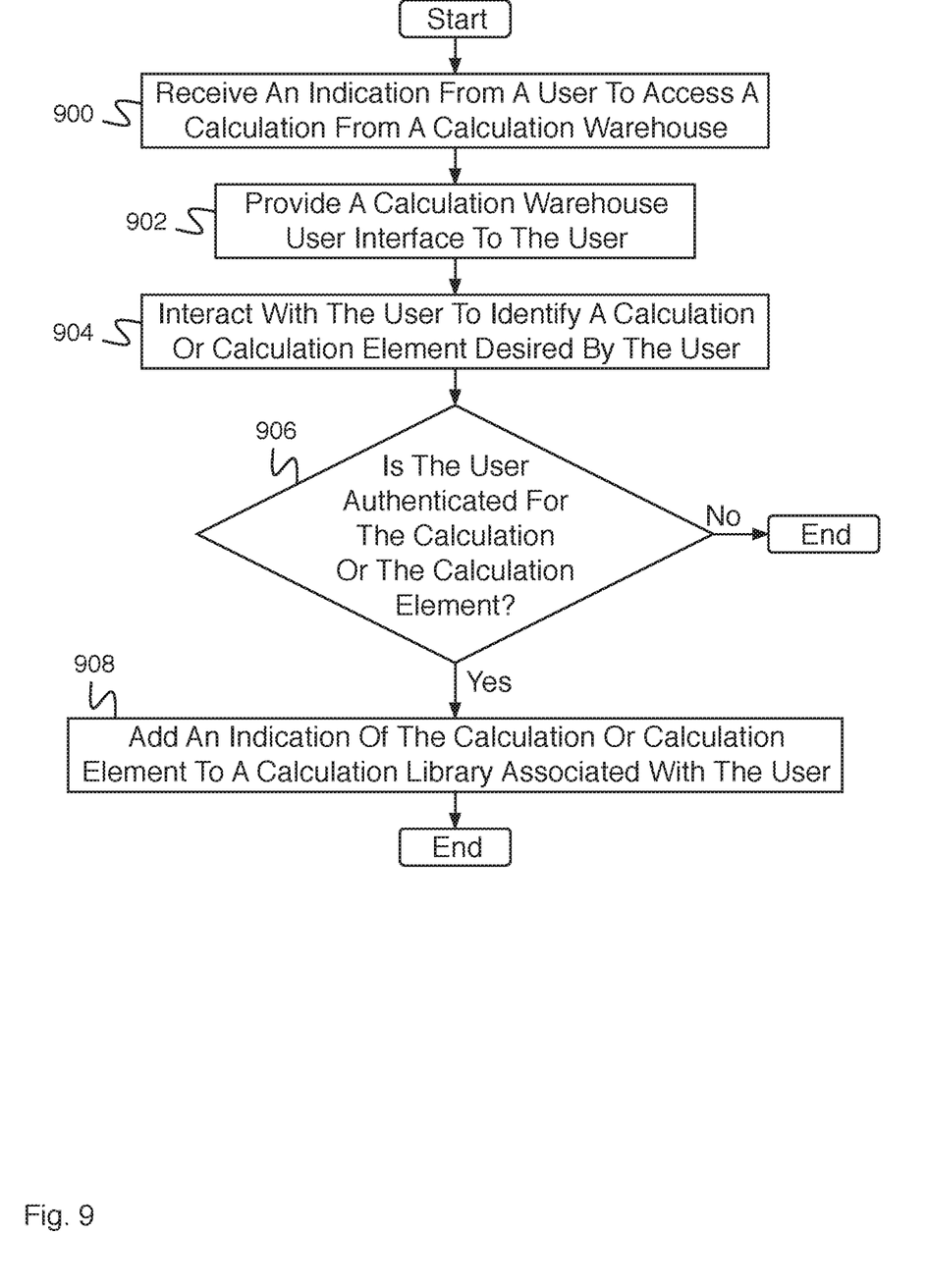
FIG. 9 is a flow diagram illustrating an embodiment of a process for using a calculation warehouse.

FIG. 9 is a flow diagram illustrating an embodiment of a process for using a calculation warehouse. In some embodiments, the process of FIG. 9 is executed by tenant data storage system 104 of FIG. 1 or multitenant database system 106 of FIG. 1. In the example shown, in 900, an indication is received from a user to access a calculation from a calculation warehouse. In 902, a calculation warehouse user interface is provided to the user. In 904, the process interacts with the user to identify a calculation or calculation element desired by the user. The process interacts with the user to identify a calculation or calculation element desired by the user using a calculation browser, using a calculation search, using a calculation index, etc. A user indicates to the process that a desired calculation or calculation element is found (e.g., using a "Get This Calculation" button). In 906, the process determines whether the user is authenticated for the calculation or the calculation element (e.g., whether the user possesses authentication credentials allowing access to the calculation). In some embodiments, determining whether the user is authenticated comprises executing a payment process for receiving payment for the calculation or calculation element. In the event it is determined that the user is not authenticated for the calculation or the calculation element, the process ends. In the event it is determined that the user is authenticated for the calculation or the calculation element, control passes to 908. In 908, an indication of the calculation or calculation element is added to a calculation library associated with the user.

Figure 10:
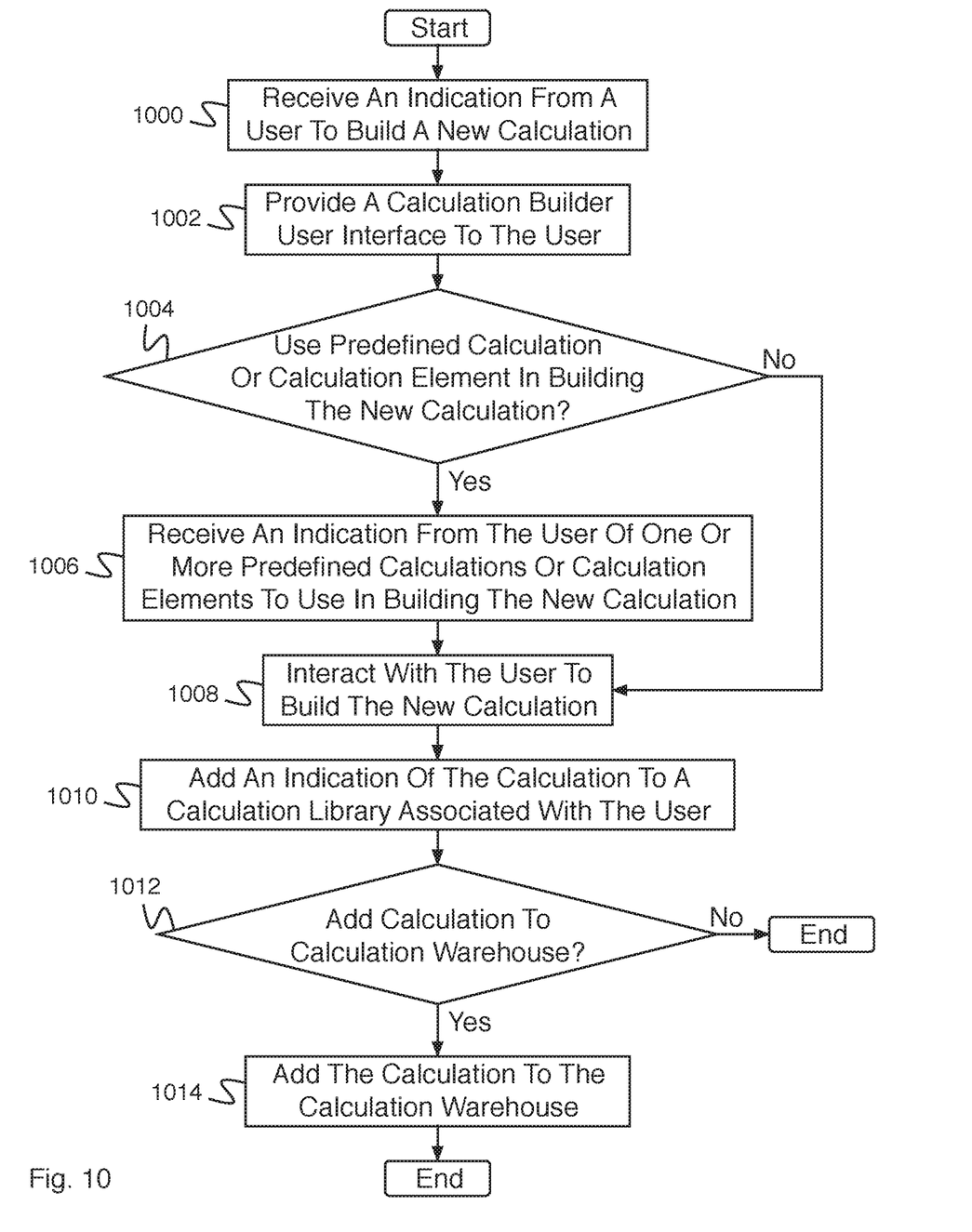
FIG. 10 is a flow diagram illustrating an embodiment of a process for using a calculation creator.

FIG. 10 is a flow diagram illustrating an embodiment of a process for using a calculation creator. In some embodiments, the process of FIG. 10 is executed by tenant data storage system 104 of FIG. 1 or multitenant database system 106 of FIG. 1. In the example shown, in 1000, an indication is received from a user to build a new calculation. In 1002, a calculation builder user interface is provided to the user. In 1004, it is determined whether to use a predefined calculation or calculation element in building the new calculation. In the event it is determined not to use a predefined calculation or calculation element in building the new calculation, control passes to 1008. In the event it is determined to use a predefined calculation or calculation element in building the new calculation, control passes to 1006. In 1006, an indication is received from the user of one or more predefined calculations or calculation elements to use in building the new calculation. In 1008, the process interacts with the user to build the new calculation (e.g., using the calculation builder user interface to receive a calculation definition). Interacting with the user additionally comprises receiving an indication that the calculation is complete. In 1010, an indication of the calculation is added to a calculation library associated with the user. In 1012, it is determined whether the calculation should be added to the calculation warehouse (e.g., the user is prompted for an indication of whether the calculation should be added, a tenant policy is checked, etc.). In the event it is determined that the calculation should not be added to the calculation warehouse, the process ends. In the event it is determined that the calculation should be added to the calculation warehouse, control passes to 1014. In 1014, the calculation is added to the calculation warehouse. Adding the calculation comprises copying calculation information to the calculation warehouse and adding a calculation authentication policy (e.g., whether the calculation is free to access, whether the calculation is free to access for certain tenants, price of the calculation if paid, licensing terms, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for using a user-defined benchmark calculation, comprising:
    an interface configured to:
    receive an indication to use the user-defined benchmark calculation from a user associated with a tenant of a plurality of tenants wherein the user-defined benchmark calculation was contributed to a calculation warehouse associated with the plurality of tenants by a different user associated with a different tenant of the plurality of tenants;
    a processor configured to:
    determine whether the user-defined benchmark calculation is part of a calculation library associated with the user;
    in response to a determination that the user-defined benchmark calculation is not part of the calculation library;
        access the user-defined benchmark calculation from the calculation warehouse comprising to determine whether the user is authenticated for the user-defined benchmark calculation based at least in part on a calculation authentication policy associated with the user-defined benchmark calculation, wherein the calculation authentication policy indicates whether the user is required to purchase the user-defined benchmark calculation or pay a license fee to gain authentication to use the user-defined benchmark calculation; and
        in response to determining that the user is authenticated for the user-defined benchmark calculation, add the user-defined benchmark calculation to the calculation library;
    perform the user-defined benchmark calculation on commingled data stored in a commingled data storage unit to determine a user-defined benchmark calculation result, wherein the commingled data storage unit stores tenant data associated with the tenant and other tenant data associated with other tenants; and
    provide the user-defined benchmark calculation result, wherein the user-defined benchmark calculation result comprises a comparison of the tenant data associated with the tenant and the other tenant data associated with the other tenants.

2. The system of claim 1, wherein the calculation warehouse comprises a plurality of available calculations.

3. The system of claim 2, wherein the calculation warehouse comprises an index for the plurality of available calculations.

4. The system of claim 3, wherein the calculation warehouse is searchable using the index.

5. The system of claim 1, wherein the calculation warehouse comprises calculation elements.

6. The system of claim 1, wherein the calculation warehouse is stored by the commingled data storage unit.

7. The system of claim 1, wherein the user-defined benchmark calculation comprises two or more calculation elements.

8. The system of claim 7, wherein the user-defined benchmark calculation includes a linkage information between the two or more calculation elements.

9. The system of claim 1, wherein the user-defined benchmark calculation includes a definition of an input or an input type for the user-defined calculation.

10. The system of claim 1, wherein the user-defined benchmark calculation includes a definition of an output or an output type for the user-defined calculation.

11. The system of claim 1, wherein the processor is further configured to provide a user interface for creating the user-defined benchmark calculation.

12. The system of claim 11, wherein the user-defined benchmark calculation is stored by a tenant data storage unit associated with the different tenant in response to an indication that creation of the user-defined benchmark calculation is complete.

13. The system of claim 11, wherein the user interface is configured to receive an indication to add the user-defined benchmark calculation to the calculation warehouse.

14. The system of claim 13, wherein the commingled data storage unit comprises the calculation warehouse.

15. The system of claim 1, wherein contributing the available calculation to the calculation warehouse comprises adding the calculation authentication policy.

16. The system of claim 1, wherein in response to determining that the user-defined benchmark calculation is part of the calculation library, access the user-defined benchmark calculation from the calculation library.

17. The system of claim 1, wherein a tenant data storage associated with the tenant of the plurality of tenants comprises the calculation library.

18. A method for using a user-defined benchmark calculation, comprising:
- receiving an indication of the user-defined benchmark calculation from a user associated with a tenant of a plurality of tenants, wherein the user-defined benchmark calculation was contributed to a calculation warehouse associated with the plurality of tenants by a different user associated with a different tenant of the plurality of tenants;
- determining whether the user-defined benchmark calculation is part of a calculation library associated with the user;
- in response to a determination that the user-defined benchmark calculation is not part of the calculation library:
  - access the user-defined benchmark calculation from the calculation warehouse, comprising determining, using a processor, whether the user is authenticated for the user-defined benchmark calculation based at least in part on a calculation authentication policy associated with the user-defined benchmark calculation, wherein the calculation authentication policy indicates whether the user is required to purchase the user-defined benchmark calculation or pay a license fee to gain authentication to use the user-defined benchmark calculation; and
  - in response to determining that the user is authenticated for the user-defined benchmark calculation, adding the user-defined benchmark calculation to the calculation library;
- performing the user-defined benchmark calculation on commingled data stored in a commingled data storage unit to determine a user-defined benchmark calculation result, wherein the commingled data storage unit stores tenant data associated with the tenant and other tenant data associated with other tenants; and
- providing the user-defined benchmark calculation result, wherein the user-defined benchmark calculation result comprises a comparison of the tenant data associated with the tenant and the other tenant data associated with the other tenants.

19. A computer program product for using a user-defined benchmark calculation, the computer program product being embodied in a non-transitory computer readable storage medium and comprising computer instructions for:
- receiving an indication of the user-defined benchmark calculation from a user associated with a tenant of a plurality of tenants, wherein the user-defined benchmark calculation was contributed to a calculation warehouse associated with the plurality of tenants by a different user associated with a different tenant of the plurality of tenants;
- determining whether the user-defined benchmark calculation is part of a calculation library associated with the user;
- in response to a determination that the user-defined benchmark calculation is not part of the calculation library:
  - access the user-defined benchmark calculation from the calculation warehouse, comprising determining, using a processor, whether the user is authenticated for the user-defined benchmark calculation based at least in part on a calculation authentication policy associated with the user-defined benchmark calculation, wherein the calculation authentication policy indicates whether the user is required to purchase the user-defined benchmark calculation or pay a license fee to gain authentication to use the user-defined benchmark calculation; and
  - in response to determining that the user is authenticated for the user-defined benchmark calculation, add the user-defined benchmark calculation to the calculation library;
- performing the user-defined benchmark calculation on commingled data stored in a commingled data storage unit to determine a user-defined benchmark calculation result, wherein the commingled data storage unit stores tenant data associated with the tenant and other tenant data associated with other tenants; and
- providing the user-defined benchmark calculation result, wherein the user-defined benchmark calculation result comprises a comparison of the tenant data associated with the tenant and the other tenant data associated with the other tenants.

* * * * *